(No Model.)
E. CROASDALE.
SPEED VARYING DEVICE.
No. 490,104. Patented Jan. 17, 1893.
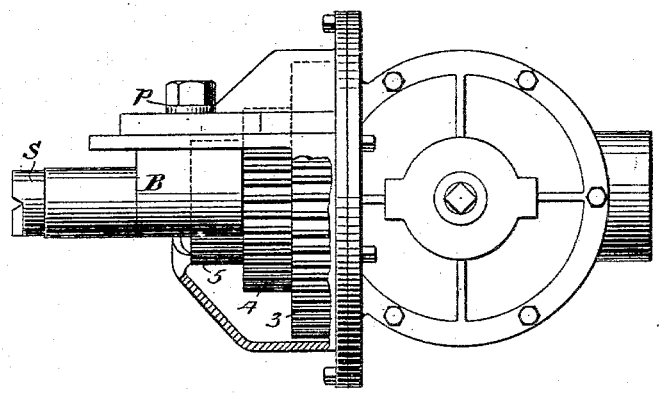
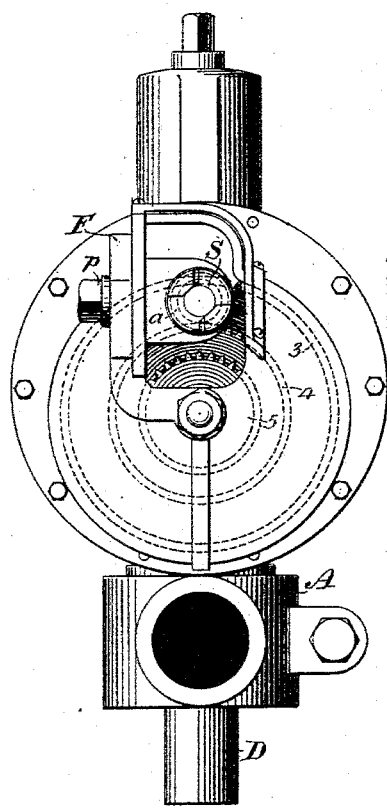
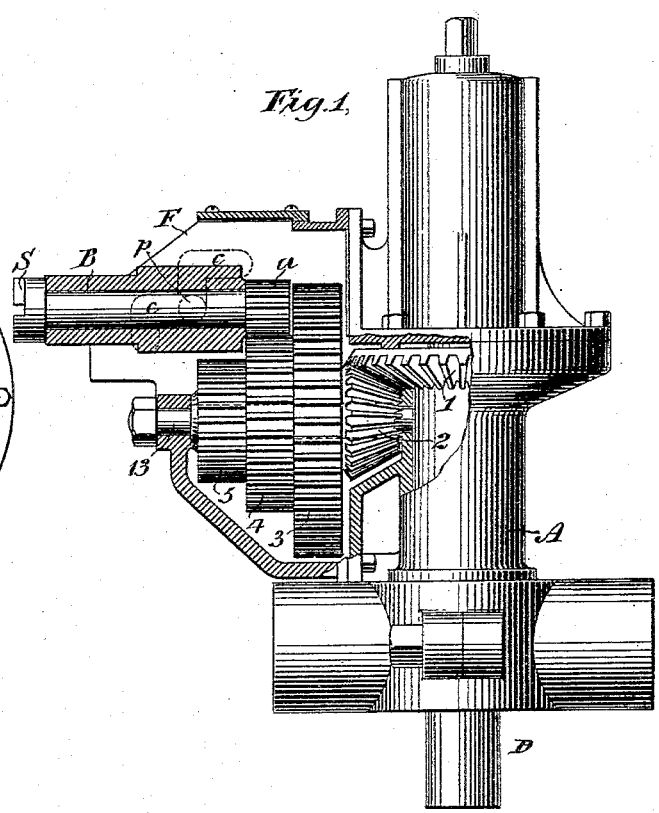
Witnesses
Edward Thorpe
U. L. Place
Edgar Croasdale, Inventor
By his Attorney Wm. B. Vansize

UNITED STATES PATENT OFFICE.

EDGAR CROASDALE, OF PHILADELPHIA, PENNSYLVANIA, ASSIGNOR TO THE ELECTRO-DYNAMIC COMPANY, OF SAME PLACE.

SPEED-VARYING DEVICE.

SPECIFICATION forming part of Letters Patent No. 490,104, dated January 17, 1893.

Application filed June 25, 1892. Serial No. 437,939. (No model.)

*To all whom it may concern:*

Be it known that I, EDGAR CROASDALE, a citizen of the United States, residing at Philadelphia, in the county of Philadelphia, in the State of Pennsylvania, have made certain new and useful improvements in devices for varying the speed with which the rotation of the driving-shaft is communicated to a second or driven shaft, of which the following is a specification.

The object of my invention is to provide means whereby while the speed of the driving shaft is maintained constant the speed of the driven shaft may be varied within predetermined limits. By the use of this device the power derived from a rapidly rotating shaft, such as that of an electric motor may be applied to widely varying conditions of work. I provide a series of two or more gear wheels of respectively different sizes, fixed in position on one shaft, and a gear wheel fixed to the second shaft and having its bearings located in a frame or channel so arranged that the last named gear wheel may be shifted with respect to either of the wheels of the first named series and caused to take a fixed position in mesh with any one of said wheels.

The accompanying drawings illustrate my invention.

Figure 1 is a side view, the casing being partly broken away to show the gear wheels; Fig. 2 is a side view, and Fig. 3 is a view from above, part of the gear casing being broken away.

D is a driven shaft shown as arranged to carry or operate a rock drill; it is in a casing A. Fixed to the shaft D is a bevel gear wheel 1. There is a shaft 13 having bearings in the frame or casing and carrying a smaller bevel gear 2 meshing with gear 1. Fixed upon shaft 13 are three gear wheels designated as 3, 4 and 5; these three wheels have a fixed relation with respect to each other.

S is a shaft driven by an electric or other rapidly rotating form of motor; upon its interior end is a small gear wheel $a$ arranged to mesh with and co-operate with either wheel 3, 4 or 5. The shaft S rotates in a bearing B, and this bearing B is movable so that the wheel $a$ is movable and has a changeable relation with respect to the wheels 3, 4 and 5. Upon bearing B is a pin $p$ moving in an angular slot or channel $c$ in the frame F fixed to the casing A. This slot or channel is like a pair of steps, and when pin $p$ is upon the upper step or near the upper end of channel $c$ the wheel $a$ is in mesh with fixed wheel 3; when pin $p$ is in the intermediate position shown in the drawings wheels $a$ and 4 mesh together and the speed of rotation of shaft D is increased as compared with that when $a$ and 3 are together. By moving pin $p$ down into the bottom end of the slot or channel, wheels $a$ and 5 mesh together, and the speed of rotation of shaft D is still further increased. By the arrangement described a speed changing device is secured which is specially applicable for applying a rapidly rotating shaft, such as that of an electric motor, to any form of machinery or apparatus to which such power is adapted.

What I claim and desire to secure by Letters Patent is:

1. The combination in a device for varying the speed of rotating shafts of two shafts, two or more wheels of respectively different sizes attached to one shaft, a separate wheel attached to the second shaft, and a frame having an angular slot conforming to the diameters of the first named wheels and forming a bearing for said second shaft, whereby said separate wheel may be caused to engage with either of the first named wheels by changing the position of the second shaft, substantially as described.

2. In a device for varying the relative speeds of two rotated shafts the combination of two shafts, two or more gear wheels of respectively different diameters attached to one shaft, a separate gear wheel attached to the other shaft, and a frame having an angular slot forming a bearing for said second shaft, substantially as described.

3. In a speed changing device the combination of the shaft 13 having wheels 3 and 4 attached thereto, and the shaft S, the wheel $a$ attached thereto, the bearing B for said shaft, the pin $p$, and the frame having an angular slot $c$, all arranged and operating substantially as described.

EDGAR CROASDALE.

Witnesses:
H. N. WEIDNER,
E. A. SCOTT.